(12) United States Patent
Taira et al.

(10) Patent No.: US 6,652,759 B2
(45) Date of Patent: Nov. 25, 2003

(54) METHOD OF TREATING WASTE WATER AND APPARATUS FOR TREATING WASTE WATER USING THE METHOD

(75) Inventors: Tsutomu Taira, Tokyo (JP); Keiji Hirano, Tokyo (JP); Junji Okamura, Himeji (JP); Mitsuaki Ikeda, Himeji (JP); Kunio Sano, Akou (JP)

(73) Assignees: NEC Corporation, Tokyo (JP); Nippon Shokubai Co., Ltd., Osaka (JP)

(*) Notice: Subject to any disclaimer, the term of this patent is extended or adjusted under 35 U.S.C. 154(b) by 8 days.

(21) Appl. No.: 09/832,940

(22) Filed: Apr. 12, 2001

(65) Prior Publication Data

US 2001/0040135 A1 Nov. 15, 2001

(30) Foreign Application Priority Data

Apr. 14, 2000 (JP) ........................................ 2000-114086

(51) Int. Cl.[7] .................................................. C02F 1/72
(52) U.S. Cl. ........................ 210/763; 210/903; 210/908; 252/175; 502/300; 502/315; 96/200
(58) Field of Search ................................ 210/758, 763, 210/903, 908; 252/175; 502/300, 515; 96/200

(56) References Cited

U.S. PATENT DOCUMENTS

| 4,447,333 A | 5/1984 | Wagener et al. |
| 5,045,288 A | 9/1991 | Raupp et al. |
| 5,589,599 A | * 12/1996 | McMullen et al. |
| 5,635,076 A | 6/1997 | Bremer et al. |

FOREIGN PATENT DOCUMENTS

| EP | 0 431 932 | 6/1991 |

OTHER PUBLICATIONS

WPI abstract accession No. 2000–091701 [08] & JP 11333252 A (Babcock) Jul. 12, 1999 (see abstract).

WPI abstract accession No. 1989–296669 [41] & JP 1218684 A (Nippon Shokubai) Aug. 31, 1989 (see abstract).

* cited by examiner

*Primary Examiner*—Betsey Morrison Hoey
(74) *Attorney, Agent, or Firm*—Wenderoth, Lind & Ponack, L.L.P.

(57) ABSTRACT

The present invention provides a method of treating waste water including nitrogen-containing organic compounds to convert these compounds into harmless gases without performing a post-treatment. The method comprises spraying waste water in a heated space to gasify the waste water into waste gas, and oxidizing the waste gas by contacting it with a catalyst to convert the nitrogen-containing organic compounds into harmless gases. An apparatus for treating waste water using the method is also disclosed.

20 Claims, 3 Drawing Sheets

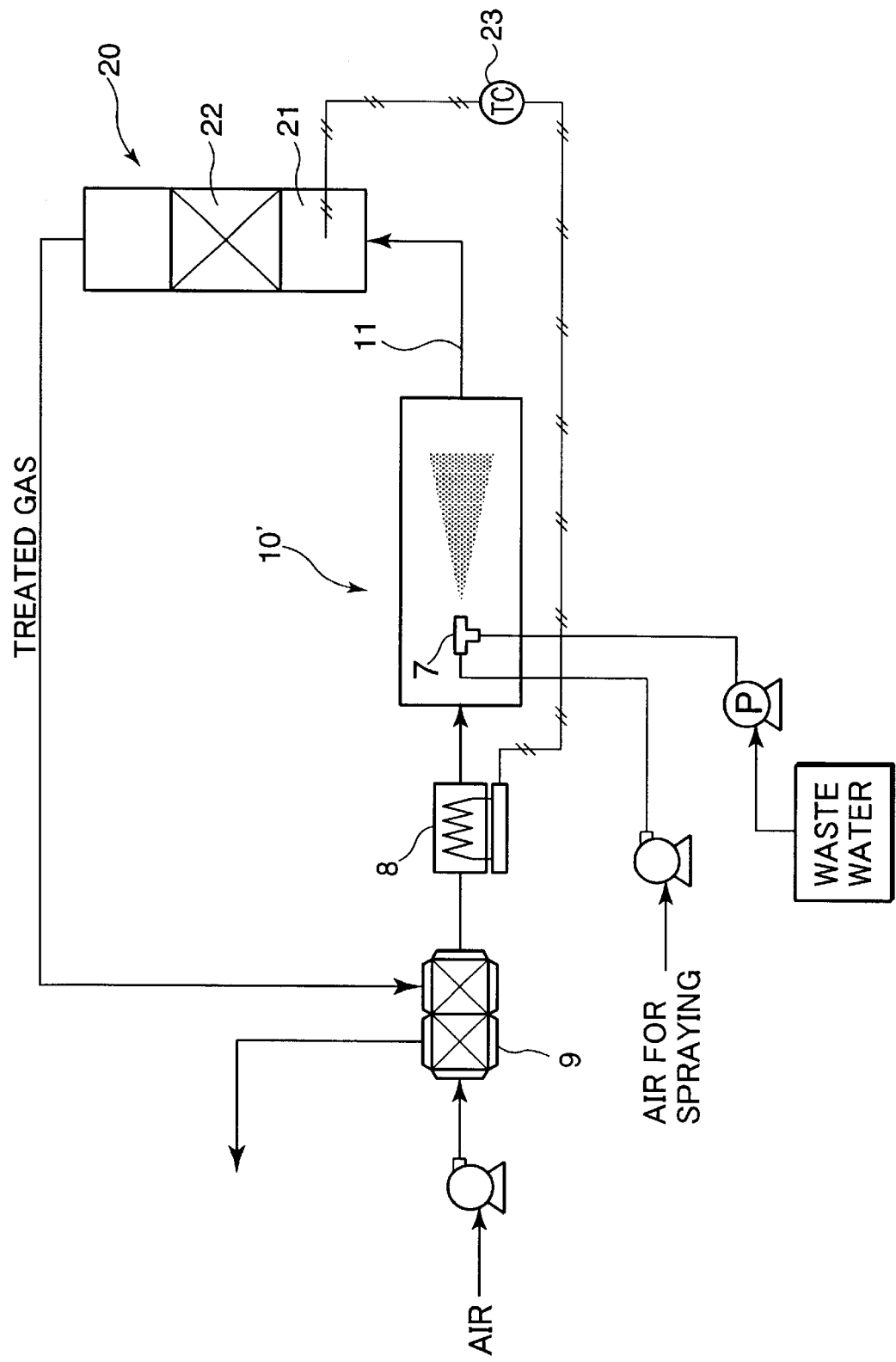

METHOD OF TREATING WASTE WATER AND APPARATUS FOR TREATING WASTE WATER USING THE METHOD

BACKGROUND OF THE INVENTION

1. Field of the Invention

The present invention relates to a method of treating waste water to convert nitrogen-containing organic compounds into harmless gases such as nitrogen gas, carbon dioxide and the like, and an apparatus for treating waste water using the method. In particular, the invention relates to a method for treating waste water exhausted from a semiconductor manufacturing plant after dissolving and washing a photoresist, and relates to an apparatus suitable for treating such a waste water.

2. Prior Art

Waste water exhausted from various chemical plants, semiconductor manufacturing plants and the like sometimes includes nitrogen-containing organic compounds. Conventionally, as a method of treating waste water, an incineration method, a biological treatment method utilizing a function of micro-organisms, a decomposition treatment method utilizing super-critical water, and the like have been proposed.

The incineration method is the one in which waste water including nitrogen-containing organic compounds and/or hydrocarbons are burned at a high temperature so as to be oxidized, decomposed and treated, and nitrogen oxides ($NO_x$) are produced as a result. Exhausting nitrogen oxides to the atmosphere will cause acid rain, and thus it is necessary to prepare treatment facilities for converting $NO_x$ to harmless compounds. Therefore, treatment of waste water according to incineration methods has such a disadvantage in that treatment facilities are apt to be large and require high construction costs.

The biological treatment method utilizes micro-organisms for decomposing organic compounds, such as a nitrogen-containing organic compound in waste water into nitrogen, water and carbon dioxide. This method has an advantageous effect in that organic compounds can be treated under moderate conditions and converted into harmless nitrogen gas and the like through decomposition thereof. However, this method has a disadvantage in that efficiency of decomposition is low, and an apparatus used for performing such a method must be large in order to guarantee sufficient ability to treat waste water. Large treatment facilities for the biological treatment method cause higher costs for their construction, similar to treatment facilities for the incineration method. Furthermore, the biological treatment method requires post-treatment of excess sludge produced through decomposition of organic compounds. Thus, the biological treatment method has some problems.

The decomposition treatment method utilizing super-critical water is one which utilizes physical and/or chemical properties of water in a super-critical state. In order to render water super-critical, it is necessary to maintain water in a state of high temperature and high pressure. Thus, heat resistance and pressure tightness are strictly required for treatment facilities, and devices such as a high pressure pump and a high pressure compressor are needed in order to accomplish the super-critical state. Furthermore, when organic compounds included in waste water are low in concentration, it is necessary to concentrate waste water prior to a decomposition treatment utilizing super-critical water.

Recently, a method which comprises gasifying waste water to produce waste gas, and oxidizing and decomposing the waste gas with a catalyst is suggested as a method of treating waste water without requiring large facilities and high construction costs.

For example, Japanese Patent unexamined laid-Open No.83081/90 (hereinafter referred to as prior art "1") discloses a method of concentrating waste water through evaporating water therein, then separating a non-volatile contaminant and a vapor from the concentrated waste water, and oxidizing the vapor with a catalyst in the presence of water vapor. In this method, evaporation is carried out at a temperature of about 82° C. to about 170° C., and silica, alumina or chromic oxide is used as a catalyst. Therefore, harmful gases such as $NO_x$ and $SO_x$ are produced by catalytic oxidation and facilities are required for post-treating oxidized products.

Furthermore, Japanese Patent unexamined laid-open No.75913/97 (hereinafter referred to as prior art "2") discloses a method of treating photographic processing waste water. In this method, waste water is heated by microwaves and a residual solid material is separated and removed, and thereafter, ammonia, which is included in a vaporized gas, is converted into nitrogen gas and water. The nitrogen gas can be exhausted to the atmosphere as it is, and the treated water can be drained into a sewage system. With this method, harmful $NO_x$ and $SO_x$ are not produced as a resulting product, and thus it is not necessary to provide post-treatment facilities, for resulting products along with an apparatus for treating waste water. However, prior art "2" does not disclose a catalyst with which ammonia gas is decomposed into nitrogen gas and water vapor. Thus, the method disclosed in prior art "2" cannot be directly applied to waste water including nitrogen compounds other than ammonia, particularly, waste water exhausted from a semiconductor manufacturing plant after cleaning photoresist. This is because the waste water includes nitrogen-containing organic compounds such as tetramethylammonium hydroxide, which is difficult to be gasified by microwaves.

SUMMARY OF THE INVENTION

The present invention has been carried out in view of these circumstances, and it is an object of the invention to provide a method of treating waste water including nitrogen compounds other than ammonia, in particular, nitrogen-containing organic compounds to convert the nitrogen-containing organic compounds into harmless gases such as nitrogen gas and carbon dioxide, without performing a post-treatment. Another object of the present invention is to provide an apparatus for treating waste water using the inventive method of treating waste water.

One aspect of the present invention is a method of treating waste water which comprises: first, spraying waste water including a nitrogen-containing organic compound into a heated space to gasify substantially all of the waste water to waste gas; and second, oxidizing the waste gas by contacting it with a catalyst to convert the nitrogen-containing organic compound into nitrogen gas, carbon dioxide and water vapor.

Another aspect of the present invention is an apparatus for treating waste water which comprises: a device for gasifying waste water, which device includes a sprayer for spraying waste water; a gasifying area into which waste water is introduced, and in which area the waste water is gasified by the gasifying device to produce waste gas from the waste waster; and a reaction area which contains a catalyst for oxidizing waste gas delivered from the gasifying area, and from which reaction area an oxidized gas is exhausted.

BRIEF DESCRIPTION OF THE DRAWINGS

FIGS. 1 to 3 show first to third embodiments of an apparatus of the present invention, respectively.

Figure 1:
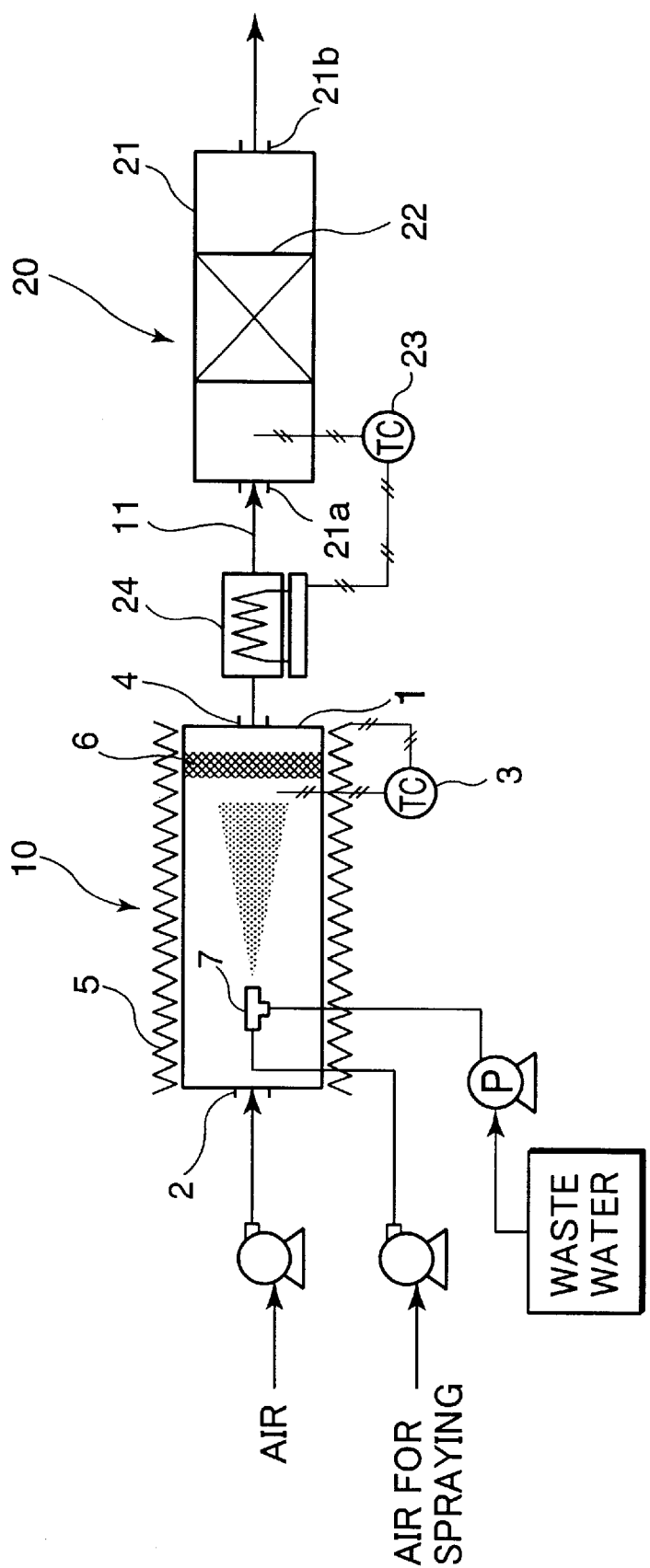

In these Figures, the inventive apparatus comprises as a device for gasifying waste water, a sprayer (7) and a gasifying area (10, 10'). The apparatus also comprises a reaction area (20) containing a catalyst (22), and a line (11) connecting the gasifying area (10, 10') to the reaction area (20).

DESCRIPTION OF THE PREFERRED EMBODIMENTS

Method of Treating Waste Water

A method of treating waste water of the present invention comprises: spraying waste water into a heated space to gasify substantially all of the waste water into waste gas (this step is referred to as a "gasifying process"); and oxidizing the waste gas by contacting the waste gas with a catalyst (this is referred to as a "catalytic oxidation process").

The waste water to be treated according to the method of the present invention includes nitrogen-containing organic compounds. Any nitrogen-containing organic compound soluble in water may be included in the waste water. Specific examples of nitrogen-containing organic compounds include amines such as methylamine, ethylamine, dimethylamine, diethylamine, trimethylamine, triethylamine and ethylendiamine; imines such as ethyleneimine; nitrils such as acetonitrile and acrylonitrile; amides such as acetamide; quaternary alkylammonium salts such as tetramethylammonium hydroxide, tetraethylammonium hydroxide and choline; alkanolamine such as monoethanolamine and diethanolamine; and the like.

An amount of nitrogen-containing organic compounds in the waste water does not matter. When concentration of nitrogen-containing organic compounds included in waste gas, provided by spraying waste water into a heated space to gasify substantially all of waste water, is excessively increased, there may occur a problem associated with excessive increase of a calorific value upon catalytic oxidation. However, this problem can be solved by increasing an amount of oxygen or air provided for catalytic oxidation.

Not only nitrogen-containing organic compounds but also nitrogen-free organic compounds, particularly hydrocarbons may be included in the waste water. As for developer waste water exhausted from a semiconductor manufacturing plant, hydrocarbons which are dissolved from a resin as a resist material are contained in the developer waste water.

The heated space, where substantially all of waste water to be treated is gasified, is specifically heated under normal pressure to 100° C. or more, preferably to 250° C. or more, more preferably to 500° C. or more. The sprayed waste water is heated up to such a temperature that water, as well as organic compounds included in the waste water, can be gasified in the heated space. Even if a less volatile and high molecular organic compound is included in the waste water, such an organic compound can be decomposed and gasified by heating the same to 500° C. or more. Tetramethylammonium hydroxide, which is included in developer waste water exhausted from a semiconductor manufacturing operation, is decomposed into trimethylamine and methanol at about 130° C. and gasified.

Incidentally, an upper limitation of the temperature in the heated space is 700° C. or less, preferably 550° C. or less, because heating the waste water at a temperature over 700° C. is disadvantageous in view of fuel for heat.

As a device for heating the sprayed waste water in the heated space, a heater is most commonly used. The waste water could be easily gasified by spraying it into a closed vessel under a condition having a high temperature and reduced pressure. Furthermore, the sprayed waste water could be gasified by contacting it, with another gas heated to a higher temperature, in a heated space. Oxygen or air used for oxidation in the following catalytic oxidation process may be used as the heated gas used for gasifying the waste water. A treated gas discharged after catalytic oxidation process is also usable, because the treated gas is sometimes elevated to a higher temperature by exothermic reaction during the gasifying process and oxidation reaction.

The catalytic oxidation process is carried out by bringing the waste gas together with an oxidant, such as oxygen or air, into contact with a catalyst.

A catalyst for the catalytic oxidation process comprises an oxide (hereinafter referred to as component "A" or first component) including titania and/or titania-silica; an oxide (hereinafter referred to as component "B" or second component) of at least one element selected from the group consisting of vanadium, tungsten, molybdenum, cerium and iron; and a metal or an oxide thereof (hereinafter referred to as component "C" or third component) of at least one element selected from the group consisting of platinum, palladium, iridium, rhodium, ruthenium, manganese, chromium and copper.

A preferred catalyst is one in which the content of component "A" is 70% to 99% by mass, the content of component "B" is 0.5% to 30% by mass, and the content of component "C" is 0.001% to 20% by mass, based on the total mass of the catalyst.

Component "A" in the catalyst improves activity and durability of the catalyst. A catalyst containing component "A" of less than 70% by mass therein shows insufficient activity and durability. On the other hand, a catalyst containing component "A" of more than 99% by mass therein shows insufficient activity by relatively decreasing the contents of both components "B" and "C". Component "A" is preferably included in the catalyst in the form of a composite oxide such as titania-silica, because morphology of titania-silica is superior to that of single component oxide titania with regard to activity and durability. For example, Kozo Tanabe (CATALYST, vol. 17, No.3, page 72, 1975) teaches that a binary composite oxide consisting of Ti and Si, which is well known as a composite oxide presenting solid acid, shows more remarkable acid properties as compared with a single oxide of each of the constituent elements. Furthermore, it is known that titania-silica has an amorphous or amorphous-like fine structure, and thereby has a high surface area and a large pore volume. Reasons why the composite oxide (titania-silica) is excellent in catalyst performance are not exactly known. However, it is considered as follows: an improvement in a basic gas adsorbing performance, a tendency of components "B" and "C" to highly disperse, and the like, would be realized by specific properties as mentioned above, and thus a catalyst containing titania-silica can be superior to a catalyst consisting of titania with regard to catalytic activity.

Component "B" improves selectivity of a catalyst. A catalyst containing component "B" of less than 0.5% by mass shows insufficient selectivity, while a catalyst containing component "B" of more than 30% by mass often shows insufficient activity.

Component "C" preferably comprises at least one metal selected from the group consisting of platinum, palladium, iridium, rhodium, ruthenium, chromium, manganese and copper, or an oxide thereof in a total amount of 0.001% to 20% by mass. Furthermore, component "C" can be divided broadly into group "C1" consisting of platinum, palladium, iridium, rhodium and ruthenium, and group "C2" consisting of chromium, manganese and copper. Although a component belonging to group "C1" has higher activity than the one belonging to group "C2", a catalyst containing component "C1" in an amount of more than 10% by mass does not improve its activity as expected regardless of higher cost. Therefore, when component "C1" is used alone as component "C", the preferable content of component C1 is in the range of 0.001% to 10% by mass based on total mass of the catalyst. On the other hand, component "C2" has lower activity than component "C1", and thus component "C2" is preferably included in an amount of at least 1.0% by mass in order that the catalyst provides sufficient activity. Therefore, when component "C2" is used alone as component "C", the preferable content of component "C2" is in the range of 1.0% to 20% by mass based on total mass of the catalyst.

These catalysts may be used in the form of a proper molded shape, or may be supported with a carrier.

A catalytic oxidation process is carried out by providing gasified waste water (i.e. waste gas) together with an oxidant, such as oxygen or air, in a reaction area containing one of the catalysts mentioned above. An inlet temperature of the reaction area is preferably controlled within the range of 100° C. to 400° C. A reaction space having a temperature of less than 100° C. at its inlet cannot provide sufficient oxidation efficiency with a result that some unoxidized organic compound remains. On the other hand, where the reaction space is controlled at a temperature of more than 400° C., a nitrogen-containing compound is excessively oxidized to easily produce nitrogen oxides ($NO_x$), and thus post-treatment of the resultant $NO_x$ is needed. Indeed, when a mixture of waste gas and an oxidant, which is fed to the catalytic oxidation process, has a temperature ranging from 100° C. to 400° C., the mixture can be introduced into the reaction area as it is, while when a temperature of the mixture to be fed to the catalytic oxidation process is lower than that adjusted in the reaction area, the mixture should be re-heated and then be introduced into the reaction area.

According to a preferred embodiment of the present invention, waste gas flows at a space velocity (SV) of 500 to 50000 per hour at a temperature of 100° C. to 400° C. More preferable space velocity is within the range of 1000 to 10000 per hour. A space velocity (SV) of less than 500 per hour requires a large amount of a catalyst and a larger apparatus for treating waste water with a result in unsatisfied efficiency, while an SV of more than 50000 per hour remarkably decreases efficiency of decomposition of nitrogen-containing organic compounds.

Waste gas discharged after a gasifying process is oxidized and decomposed during a catalytic oxidation process under above-mentioned conditions to be converted into harmless gases such as nitrogen gas, carbon dioxide and water vapor. These harmless gases may be exhausted into the atmosphere as they are.

Besides nitrogen-containing organic compounds and hydrocarbon, waste water to be treated sometimes includes a metal element (for example, Si), sulfur, and/or an organic compound which is difficult to decompose (for example, rubber or a thermosetting resin). Such a metal element, sulfur and/or a difficult to decompose organic compound cannot be gasified during a gasifying process and remain as solid materials. These solid materials could provide an undesired effect to the catalyst, and cause decrement of reaction efficiency during a catalytic oxidation process. Therefore, it is preferable to separate and remove such harmful solid materials from waste gas, prior to transferring the waste gas from the gasifying process to the catalytic oxidation process.

The harmful solid materials are preferably removed with a pre-treating agent. Preferable examples of the pre-treating agent include at least one material selected from the group consisting of alumina, silica, titania and zirconia. Such a pre-treating agent may be commonly used in the shape of pellet, but not limited thereto.

According to the method of treating waste water of the present invention, nitrogen-containing organic compounds included in waste water are selectively oxidized and decomposed so that production of $NO_x$ and/or ammonia can be inhibited, and thus it is not necessary to prepare facilities for post-treating $NO_x$ and/or ammonia. Indeed, nitrogen components included in waste water are converted into harmless nitrogen gas, while carbon components are converted into carbon dioxide, and thus such resulting gases can be exhausted to the atmosphere as they are.

Apparatus for Treating Waste Water

An apparatus for treating waste water of the present invention is used to perform the method of treating waste water mentioned above and comprises the following elements: a device for gasifying waste water, which device includes a sprayer for spraying waste water, a gasifying area into which waste water is introduced, and in which area the waste water is gasified to produce waste gas; and a reaction area which contains a catalyst for oxidizing the waste gas delivered from the gasifying area, and from which reaction area an oxidized gas is exhausted. The apparatus in accordance with the invention may further comprise a pretreatment area for removing a solid material not gasified in the gasifying area.

The inventive apparatus will be explained referring to accompanying drawings. Incidentally, in the drawings, elements shown with the same numerals are identical or similar to each other, and thus an explanation about these elements will not be repeated.

A first embodiment of the inventive apparatus for treating waste water as shown in FIG. 1 employs a combination of a sprayer (7) and a heater (5) as components of a device for gasifying waste water substantially in its entirety.

A closed vessel (1) constitutes a gasifying area (10), and the heater (5) is equipped around the closed vessel (1). The sprayer (7), which constitutes the gasifying device along with the heater (5) and gasifying area (10), is set in the vessel (1). Waste water is fed via a pump to the sprayer (7) while air for spraying is fed via a blower to the sprayer (7), and mixture of the waste water and the air are sprayed by the sprayer (7) to gasify the waste water into waste gas.

The closed vessel (1) has an inlet (2) through which air for oxidizing waste gas is introduced, and an outlet (4) through which the waste gas and air for oxidation are discharged.

The inlet (2) is provided on one side of the vessel (1) and the outlet (4) is provided on an opposite side thereof. Temperature in the closed vessel (1) is monitored with a temperature sensor provided therein, and the heater (5) is controlled by a temperature controller (3) so that the temperature in the closed vessel (1) can be maintained to a temperature sufficient for gasifying the waste water.

On the upstream side in a gas flow direction with respect to the outlet (4), a pre-treating agent (6) is provided as a pre-treatment area.

A line (11) connects the gasifying area (10) to a reaction area (20).

The reaction area (20) comprises a closed vessel (21) containing an oxidation catalyst (22), wherein the waste gas delivered from the gasifying area (10) through an inlet (21a) of the closed vessel (21), and an oxidized gas resulting from contacting the waste gas with the oxidation catalyst (22), are exhausted through an outlet (21b) of the closed vessel (21). A second heater (24) (hereinafter referred to as a "reheater") is provided in the gas supply line (11) between the outlet (4) and the inlet (21a), so that waste gas can be heated prior to being introduced into the reaction area (20) when a temperature of gas discharged from the gasifying area (10) is excessively low. A temperature controller (23) having a temperature sensor is provided near the inlet (21a). The temperature controller (23) controls temperature of the reaction area (20) so that temperature of gas introduced thereinto can be maintained at a temperature, suitable for catalytic oxidation, by switching on the reheater (24) when a temperature of the introduced gas temperature is excessively low.

As the pre-treating agent (6), may be used any one of pre-treating agents exemplified in connection with the inventive method of treating waste water, namely, at least one material selected from the group consisting of alumina, silica, titania and zirconia. As the catalyst (22), may be used any one of catalysts exemplified in connection with the inventive method of treating waste water, namely, a catalyst comprising component "A" of an oxide comprising titania and/or titania-silica; component "B" of an oxide of at least one metal selected from the group consisting of vanadium, tungsten, molybdenum, cerium and iron; and component "C" of at least one metal selected from the group consisting of platinum, palladium, iridium, rhodium, ruthenium, manganese, chromium and copper, or an oxide thereof.

In the apparatus for treating waste water of the present invention, waste water and air are supplied to the gasifying area (10) and sprayed and heated therein, and thus substantially all of the waste water is gasified into waste gas. Non-volatile components such as Si, sulfur and/or a thermosetting resin component, namely solid material, which cannot be gasified in the gasifying area (10), are removed using a pre-treating agent. Then, a resulting waste gas after removing non-volatile components from the waste gas is fed to the reaction area (20), in which the resulting waste gas is selectively oxidized by contacting it with a catalyst so as to be converted into nitrogen gas, carbon dioxide and water vapor. Resultant gases such as nitrogen gas, carbon dioxide and water vapor can be exhausted from the reaction area (20) to the atmosphere as they are, because these resultant gases are harmless.

Incidentally, in the first embodiment of the inventive apparatus, a pre-treating agent may not be provided when waste water to be treated includes a little amount of non-volatile components. Oxygen or air for oxidation may be fed into the reaction area (20) as well as the gasifying area (10).

Figure 2:
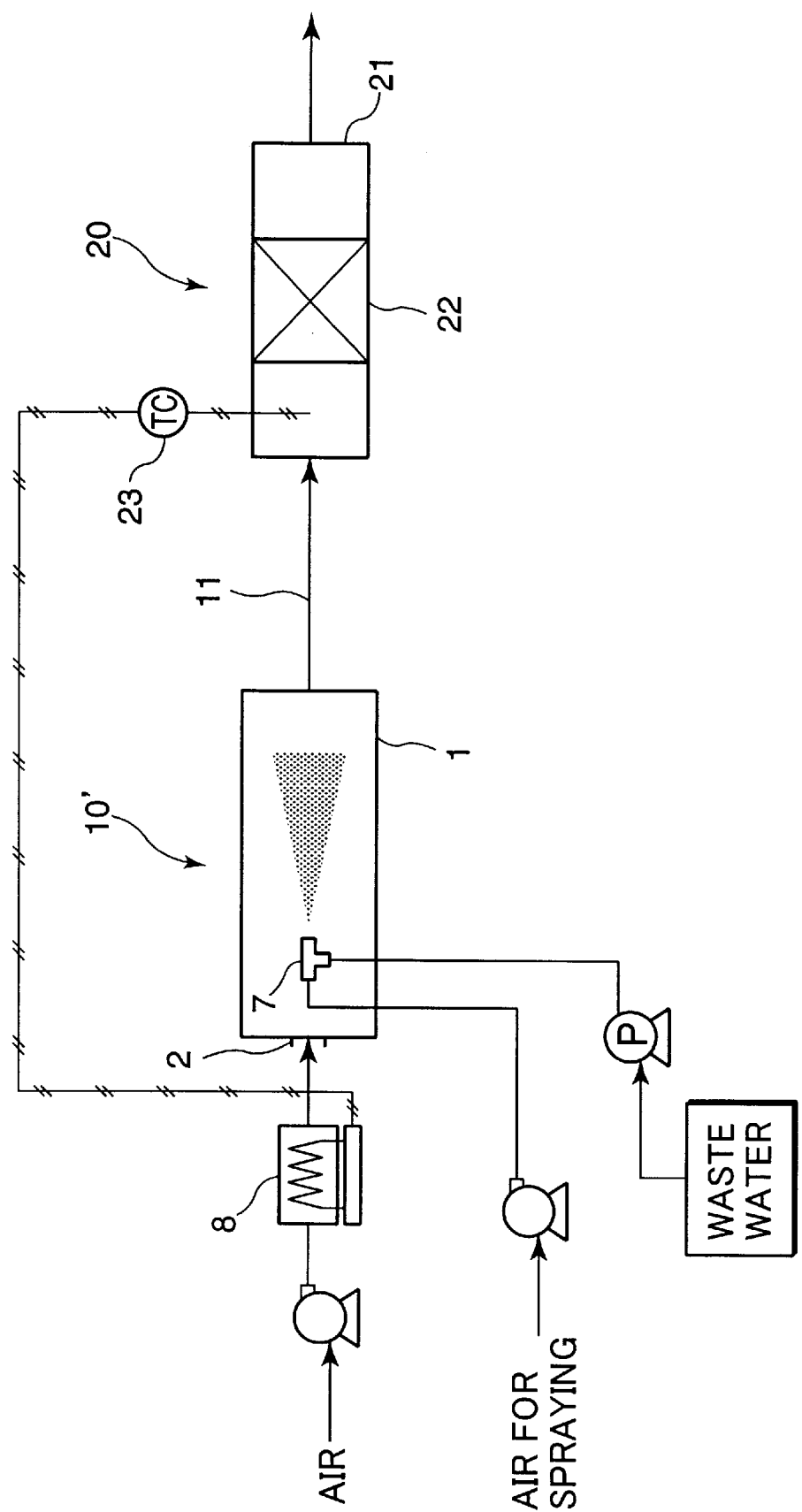

Next, a second embodiment of the apparatus for treating waste water in accordance with the present invention will be explained on the basis of FIG. 2.

A closed vessel (1) constitutes a gasifying area (10'), and a sprayer (7) as part of a gasifying device is positioned within the vessel (1). Waste water to be treated is fed via a pump to the sprayer (7), while air for spraying is fed via a blower to the sprayer (7). The waste water and the air for spraying are sprayed in the closed vessel (1) to gasify the waste water into waste gas. The closed vessel (1) has an inlet (2) at one side thereof. Air heated by a heater (8) is introduced into the vessel (1) through the inlet (2).

Temperature of the reaction area (20) is controlled with a temperature controller (23) by monitoring a temperature in reaction area (20) with a temperature sensor provided near an inlet of the reaction area (20), and controlling the heater (8) in order to make a temperature of the waste gas sufficient for catalytic oxidation.

The reaction area (20) is identical to the one of the first embodiment of the inventive apparatus described above.

In the second embodiment of the apparatus for treating waste water, waste water to be treated and air for spraying are supplied to the sprayer (7), and are sprayed in the closed vessel (1) by the sprayer (7), while air heated with heater (8) is supplied into the closed vessel (1). Waste water sprayed in the closed vessel (1) is mixed with the heated air, and thereby the sprayed waste water can be sufficiently heated so as to be gasified into waste gas. A mixture of the waste gas and the heated air from the vessel (1) is introduced into the reaction area (20), in which the mixture is selectively oxidized by being contacted by a catalyst (22), and thus nitrogen-containing organic compounds included in the waste gas are converted into nitrogen gas, carbon dioxide and water vapor. These gases resulting from oxidation are exhausted from the reaction area (20).

According to the second embodiment of the inventive apparatus, temperature control of the reaction area (20) is accomplished by the temperature controller (23) and the heater (8). Positioning the heater (8) upstream with respect to the inlet (2) of the closed vessel (1) in the gas flow direction enables for provision of a simplified and compacted apparatus, and furthermore provides a simplified temperature control mechanism. In view of this, the second embodiment of the inventive apparatus is more advantageous than the first embodiment.

Next, a third embodiment of the apparatus for treating waste water of the present invention will be explained on the basis of FIG. 3.

In light of the fact that a treated gas exhausted from reaction area (20) has a higher temperature than an ordinary temperature in the second embodiment described above, the treated gas is utilized for heating air for oxidation introduced into gasifying area (10') in the third embodiment of the inventive apparatus. Therefore, a heat exchanger (9) is provided in an air supply line between a blower for oxidant air and a heater (8). Treated gas delivered from the reaction area (20) and the oxidant air are introduced into the heat exchanger (9), where the oxidant air is heated by providing thereto thermal energy from treated gas having a higher temperature. Heated air for oxidizing air is introduced from the heat exchanger (9) to the heater (8), and treated gas having a lower temperature is exhausted to the atmosphere.

According to the third embodiment of the inventive apparatus, thermal energy of a treated gas discharged from the reaction area (20) is effectively utilized, thereby energy-savings can be achieved with regard to the heater (8) for heating air for oxidation. This is an advantage of the third embodiment.

Incidentally, in the second and third embodiments of the inventive apparatus, if necessary, a pre-treating agent may be provided in the gasifying area (10). Furthermore, in each of the first to third embodiments, for a purpose of improving efficiency of diffusion and/or mixing of gases introduced into the gasifying area (10, 10'), a wire-netting may be positioned in the closed vessel and/or the closed vessel may be filled with many ring-shaped substrates.

As described above, an apparatus for treating waste water of the present invention does not require large facilities and high costs for construction because the apparatus substantially comprises two closed vessels, one constituting a gasifying area and the other constituting a reaction area.

EXAMPLE

Preparation of Catalysts

Catalyst "1":

A composite oxide consisting of titania and silica was prepared according to the following procedure. 21.3 kg of SNOWTEC 20 (which is a silica sol manufactured by Nissan Chemical Industries, Ltd. and includes about 20% $SiO_2$ by mass) was added to 700 liters of 10% by mass of aqueous ammonia, and agitated and mixed therewith. 340 liters of a sulfuric acid solution of titanyl sulfate was slowly dropped into the resulting mixture while agitated, so as to provide a gel material. This gel material was left for three hours, and thereafter filtrated and water-washed, and dried at 150° C. for ten hours, and then calcined at 500° C. for six hours. Resulting powder had a composition of a molar ratio of $TiO_2:SiO_2=4:1$, and a BET specific surface area of 200 $m^2/g$.

12 kg of 15% monoethanolamine including 2.00 kg of ammonium metavanadate and 0.77 kg of ammonium paratungstate was added to 20 kg of the above powder, and starch as a molding assistant was added thereto, and these were mixed by a kneader. An obtained mixture was formed into a honeycomb substrate using an extruder, with the honeycomb substrate having an outside dimension of 80 square mm, a cell opening of 2.8 mm, a thickness of 0.5 mm and a length of 450 mm.

This honeycomb substrate was dried at 80° C., and calcined at 450° C. in an air atmosphere for five hours. Composition of the calcined honeycomb substrate had a mass ratio of Ti—Si composite oxide:$V_2O_5$:$WO_3$=90:7:3.

This honeycomb substrate was impregnated with an aqueous palladium nitrate solution, and dried at 150° C. for three hours, and calcined at 450° C. in an air atmosphere for three hours to produce catalyst "1". Catalyst "1" had a composition of mass ratio of Ti—Si composite oxide:$V_2O_5$:$WO_3$:Pd=89.1:6.9:3:1, a BET specific surface area of 120 $m^2/g$ and a pore volume of 0.45 $cm^3/g$.

Catalyst "2":

Catalyst "2" was prepared in the same manner as catalyst "1", except that a commercial titania powder (having a BET specific surface area of 30 $m^2/g$) was used instead of a titania-silica powder. Obtained catalyst "2" had a composition of a mass ratio of $TiO_2$:$V_2O_5$:$WO_3$:Pd=89.1:6.9:3:1, a BET specific surface area of 22 $m^2/g$ and a pore volume of 0.24 $cm^3/g$.

Catalyst "3":

A powdered γ-alumina having a specific surface area of 150 $m^2/g$ was added to an aqueous oxalic acid solution so as to be slurried. A cordierite carrier in the form of a honeycomb (having an outside dimension of 150 square mm, a cell opening of 1.5 mm, a thickness of 0.35 mm and a length of 50 mm) was coated with the obtained slurry, dried and calcined to prepare a catalyst carrier. The content of $Al_2O_3$ was 15% by mass of the catalyst carrier. The catalyst carrier was impregnated with an aqueous solution including platinum nitrate, and dried at 100° C., and calcined at 450° C. in an air atmosphere for three hours so as to provide a platinum based catalyst. The content of platinum supported with the carrier was 0.1% by mass of the catalyst

Treatment of Waste Water

Example 1

In an apparatus as shown in FIG. 1, a closed vessel constituting a gasifying area was filled with 240 milliliters of rings made of SUS. Each of the rings has a diameter of 5 mm and a length of 6 mm. A reaction area contained 120 milliliters of catalyst "1" prepared as mentioned above. An aqueous solution including tetramethylammonium hydroxide in 3% by mass was treated as a model of waste water under the following conditions.

The waste water was continuously supplied to the gasifying area at a supply speed of 2.7 g/min. via a pump, and sprayed by a sprayer, wherein air and air for spraying had been flowed at a flow rate of 2.6 liters/min. as a whole under standard conditions. Temperature of the gasifying area was set to 300° C. using a heater controlled by a temperature controller. Temperature at an inlet of the reaction area was set to 275° C., 300° C. and 325° C., and the waste water was treated under these conditions, respectively. Gases treated under the respective conditions were discharged from the reaction area and compositions of the treated gases were analyzed, respectively. Incidentally, a space velocity in the reaction area corresponded to 2980 per hour.

Results of an analysis of the treated gases are shown in Table 1, in which the symbol "ND" represents—not detected—; "THC" represents concentration of total hydrocarbon remaining in a dried gas, calculated in terms of methane; "TOC" represents concentration of total organic carbon included in a condensed liquid; "AMMONIA" represents concentration of ammonia under a wet condition; and each of the remaining rows represents concentration under a dried condition.

Example 2

Example 2 was conducted in the same manner as Example 1, except that catalyst "2" was used instead of catalyst "1". Compositions of treated gases were analyzed. The results are shown in Table 1.

Comparative Example 1

Comparative Example 1 was conducted in the same manner as Example 1, except that a reactor contained catalyst "3", and the amount of catalyst "3" was exchanged for 16 milliliters. Incidentally, temperature of the reactor was set to 325° C.

Results of an analysis of treated gases are shown in Table 1.

TABLE 1

| | CATALYST 1 | | | CATALYST 2 | | | CATALYST 3 |
|---|---|---|---|---|---|---|---|
| | TEMPERATURE | | | | | | |
| | 275° C. | 300° C. | 325° C. | 275° C. | 300° C. | 325° C. | 325° C. |
| TRIMETHYLAMINE (ppm) | ND | ND | ND | ND | ND | ND | ND |
| METHANOL (ppm) | ND | ND | ND | ND | ND | ND | ND |
| THC (ppm) | 4 | 3.5 | 3 | 4 | 4 | 3 | 15 |
| TOC (mg/l) | 11 | 13 | 18 | 17 | 14 | 15 | 12 |
| AMMONIA (ppm) | 210 | 90 | ND | 350 | 160 | 0.7 | 0.9 |
| $NO_x$ (ppm) | ND | 0.2 | 20–30 | ND | 1 | 30–40 | 350 |
| $N_2O$ (ppm) | ND | ND | ND | ND | ND | 10 | 150 |
| CO (ppm) | ND | ND | ND | 2 | ND | ND | 15 |
| $CO_2$ (ppm) | 3300 | 3400 | 3350 | 3350 | 3350 | 3400 | 3400 |

Tetramethylammonium hydroxide in waste water can be decomposed into trimethylamine and methanol at a temperature of about 130° C. In the case of using any one of catalysts "1", "2" and "3", trimethylamine or methanol was not detected, and thereby it is found that trimethylamine and methanol were oxidized in the reaction area.

When catalyst "3" was used, concentration of each of $NO_x$ and $N_2O$ was higher, and thereby it is found that a nitrogen compound was converted into a nitrogen oxide. Furthermore, from concentration of carbon dioxide, it is found that most of organic carbon was oxidized into carbon dioxide. On the other hand, when catalyst "1" or "2" was used, carbon monoxide was slightly detected at each of the temperatures. However, when the catalyst "3" was used, 15 ppm of carbon monoxide was detected.

Furthermore, in connection with nitrogen components, when catalyst "1" or "2" was used, ammonia was detected at a temperature of 300° C. or less. However, when catalyst "1" was used, ammonia was not detected at a temperature of 325° C., and when catalyst "2" was used, 0.7 ppm of ammonia was detected at this temperature. Besides, when the catalyst "1" or "2" was used, $NO_x$ was detected in a very small amount, and thus most of nitrogen components were converted into nitrogen gas.

Example 3

In an apparatus for treating waste water as shown in FIG. 1, a gasifying area contained 60 milliliters of a spherical y-alumina pellet having a diameter of 5 mm as a pre-treating agent, while a reaction area contained 28 milliliters of catalyst "1". Condensed waste water exhausted from a semiconductor products manufacturing plant was used, which has a composition as shown in Table 2.

The waste water was continuously supplied to the gasifying area at a supply speed of 0.4 g/min. via a pump, and sprayed by a sprayer, wherein air and air for spraying were flowed at a flow rate of 2.0 liters/min. as a whole under standard conditions. Temperature of the gasifying area was set to 300° C. using a heater controlled by a temperature controller. Temperature of the reaction area was set to 300° C., 325° C and 350° C. Compositions of treated gases were analyzed under these respective temperatures. Incidentally, a space velocity in the reaction area corresponded to 5400 per hour.

Results of analyses of waste water before treatment and treated gases discharged from the reaction area are shown in Table 2, in which the symbol "ND" represents—not detected—.

Example 4

Example 4 was conducted in the same manner as Example 3, except that catalyst "2" was used instead of catalyst "1". Compositions of treated gases were analyzed. Result of this analysis are shown in Table 2.

TABLE 2

| | WASTE WATER | TREATED GAS (CATALYST 1) | | | TREATED GAS (CATALYST 2) | | |
|---|---|---|---|---|---|---|---|
| | | TEMPERATURE (° C.) | | | | | |
| | | 300 | 325 | 350 | 300 | 325 | 350 |
| TETRAMETHYL-AMMONIUM HYDROXIDE (mg/l) | 29100 | — | — | — | — | — | — |
| TOC (mg/l) | 19200 | 77 | 30 | 29 | 210 | 36 | 31 |
| Si (mg/l) | 40 | — | — | — | — | — | — |
| S (mg/l) | 8 | — | — | — | — | — | — |
| Al (mg/l) | 1 | — | — | — | — | — | — |
| TRIMETHYLAMINE (ppm) | — | ND | ND | ND | ND | ND | ND |
| METHANOL (ppm) | — | ND | ND | ND | ND | ND | ND |
| THC (ppm) | — | 7.5 | 7 | 7.5 | 8 | 7 | 8 |
| AMMONIA (ppm) | — | 230 | ND | ND | 600 | 10 | ND |

TABLE 2-continued

| | WASTE WATER | TREATED GAS (CATALYST 1) | | | TREATED GAS (CATALYST 2) | | |
|---|---|---|---|---|---|---|---|
| | | TEMPERATURE (° C.) | | | | | |
| | | 300 | 325 | 350 | 300 | 325 | 350 |
| NO$_x$ (ppm) | — | 0.5 | 6 | 5 | 0.5 | 15 | 23 |
| NO$_2$ (ppm) | — | ND | ND | ND | ND | ND | 17 |
| CO (ppm) | — | ND | ND | ND | 2 | ND | ND |
| CO$_2$ (ppm) | — | 7100 | 7400 | 7600 | 7100 | 7500 | 7600 |

When any one of catalysts "1" and "2" was used, trimethylamine or methanol, which can be produced by decomposition of tetramethylammonium hydroxide, was not detected.

It is found that, in the case of treatment at a temperature of 325° C. or more, TOC was decreased, carbon monoxide was not detected, and most of carbon components were converted into carbon dioxide. Furthermore, in connection with nitrogen components, it is found that concentration of ammonia produced was decreased, NO$_x$ was detected in a very small amount, and thus most of these nitrogen components were converted into nitrogen gas.

Additionally, waste water was continuously treated with catalyst "1" under conditions mentioned above for 600 hours. It was found that efficiency of treatment did not decrease, that Si, S and Al included in waste water were removed with a pre-treating agent, and that function of the catalyst in the reaction was not hindered.

This application is based on Japanese Application No. 2000-114086 filed in Japan on Apr. 14 in 2000, the contents of which are hereby incorporated by reference.

Although the present invention has been fully described by way of example with reference to the accompanying drawings, it is to be understood that various changes and modifications will be apparent to those skilled in the art. Therefore, unless such changes and modifications depart from the scope of the present invention hereinafter defined, they should be construed as being included therein.

What is claimed is:

1. A method of treating waste water, comprising:
   spraying waste water including a nitrogen-containing organic compound into a heated space to gasify substantially all of said waste water into waste gas; and
   oxidizing said waste gas by contacting said waste gas with a catalyst to convert said nitrogen-containing organic compound into nitrogen gas, carbon dioxide and water vapor.

2. The method according to claim 1, wherein spraying waste water including a nitrogen-containing organic compound into a heated space comprises spraying said waste water including said nitrogen-containing organic compound into a space at a temperature of at least 100° C.

3. The method according to claim 1, wherein oxidizing said waste gas by contacting said waste gas with a catalyst comprises oxidizing said waste gas by contacting said waste gas with a catalyst that includes
   (i) a first component of an oxide including titania and/or titania-silica,
   (ii) a second component of an oxide of at least one metal selected from the group consisting of vanadium, tungsten, molybdenum, cerium and iron, and
   (iii) a third component of at least one metal selected from the group consisting of platinum, palladium, iridium, rhodium, ruthenium, manganese, chromium and copper, or an oxide thereof.

4. The method according to claim 1, wherein oxidizing said waste gas by contacting said waste gas with a catalyst includes flowing said waste gas at a space velocity of 500 to 50,000 per hour at a temperature of from 100° C. to 400° C.

5. The method according to claim 1, further comprising:
   after the spraying of said waste water and before the oxidizing of said waste gas, removing a solid material that was not gasified during the spraying of said waste water.

6. The method according to claim 1, wherein spraying waste water including a nitrogen-containing organic compound into a heated space comprises spraying waste water including tetraalkylammonium hydroxide into said heated space.

7. The method according to claim 1, wherein spraying waste water including a nitrogen-containing organic compound into a heated space comprises spraying into said heated space waste water containing a component dissolved from a resist material.

8. The method according to claim 1, wherein oxidizing said waste gas by contacting said waste gas with a catalyst comprises bringing said waste gas together with an oxidant into contact with said catalyst.

9. The method according to claim 8, wherein bringing said waste gas together with an oxidant into contact with said catalyst comprises bringing said waste gas together with air into contact with said catalyst.

10. The method according to claim 9, wherein bringing said waste gas together with air into contact with said catalyst does not cause said nitrogen-containing organic compound to be converted into hydrogen gas.

11. The method according to claim 8, wherein bringing said waste gas together with an oxidant into contact with said catalyst comprises bringing said waste gas together with oxygen into contact with said catalyst.

12. The method according to claim 11, wherein bringing said waste gas together with oxygen into contact with said catalyst does not cause said nitrogen-containing organic compound to be converted into hydrogen gas.

13. The method according to claim 8, wherein bringing said waste gas together with an oxidant into contact With said catalyst does not cause said nitrogen-containing organic compound to be converted into hydrogen gas.

14. The method according to claim 1, wherein oxidizing said waste gas by contacting said waste gas with a catalyst to convert said nitrogen-containing organic into nitrogen gas, carbon dioxide and water vapor comprises oxidizing said waste gas by contacting said waste gas with said catalyst to convert said nitrogen-containing organic compound into nitrogen gas, carbon dioxide and water vapor, but not hydrogen gas.

15. An apparatus for treating waste water, comprising:
- a device for gasifying waste water into a waste gas, said device including a sprayer for spraying waste water and a gasifying area into which waste water is to be sprayed by said sprayer; and
- a reaction area connected to said gasifying area via a line such that waste gas delivered from said gasifying area through said line is received by said reaction area, said reaction area containing a catalyst for oxidizing the waste gas received by said reaction area, wherein said reaction area is adapted to exhaust therefrom the waste gas oxidized by said catalyst.

16. The apparatus according to claim 15, further comprising a pretreatment area for removing a solid material that is not gasified in said gasifying area.

17. The apparatus according to claim 16, wherein said pretreatment area contains at least one material selected from the group consisting of alumina, silica, titania and zirconia.

18. The apparatus according to claim 15, wherein said catalyst includes
- (i) a first component of an oxide including titania and/or titania-silica,
- (ii) a second component of an oxide of at least one metal selected from the group consisting of vanadium, tungsten, molybdenum, cerium and iron, and
- (iii) a third component of at least one metal selected from the group consisting of platinum, palladium, iridium, rhodium, ruthenium, manganese, chromium and copper, or an oxide thereof.

19. The apparatus according to claim 15, wherein said device for gasifying further includes a heater.

20. The apparatus according to claim 15, wherein said device for gasifying is constructed and arranged to utilize heat of a gas discharged from said reaction area.

* * * * *